Oct. 17, 1967  G. C. ROTH  3,347,190
LOOPER MECHANISM FOR BLIND STITCH SEWING MACHINES
Filed April 5, 1966  6 Sheets-Sheet 1

Oct. 17, 1967        G. C. ROTH        3,347,190
LOOPER MECHANISM FOR BLIND STITCH SEWING MACHINES
Filed April 5, 1966                                6 Sheets-Sheet 2
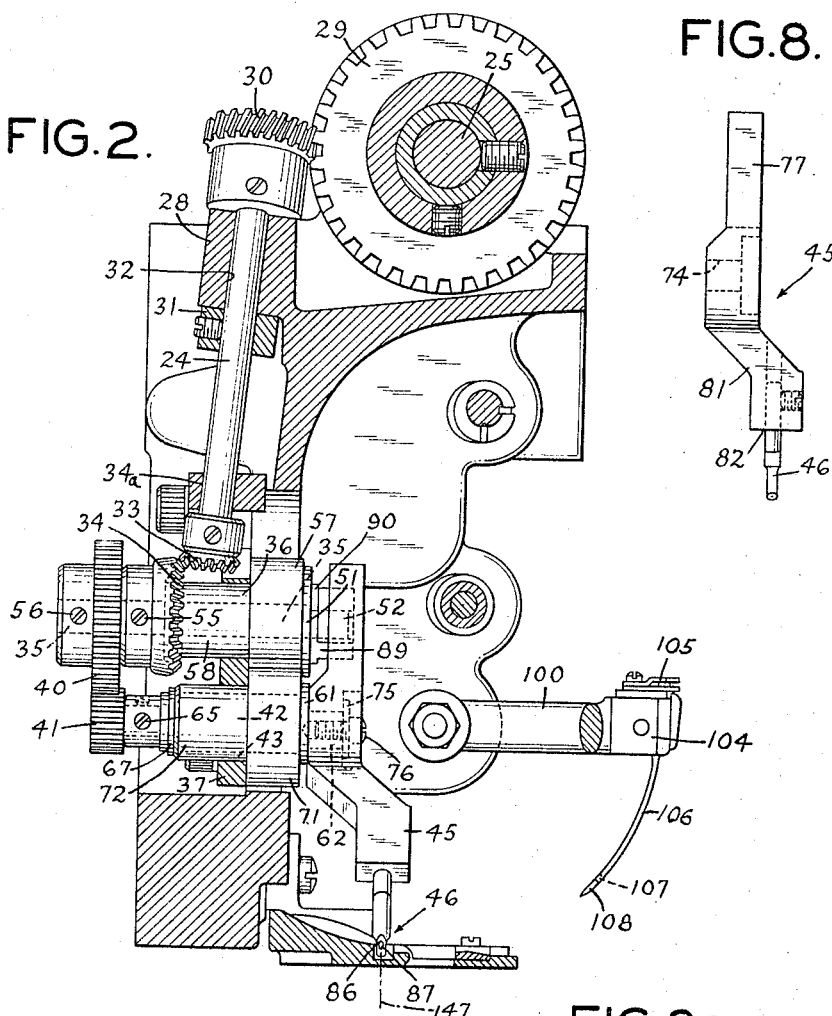
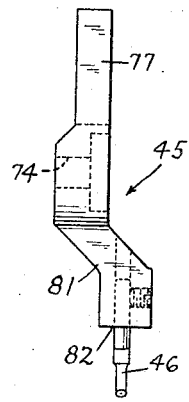
FIG.2.
FIG.8.
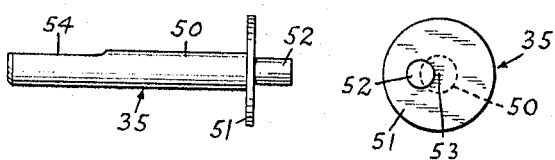
FIG.6.   FIG.6a.   FIG.8a.
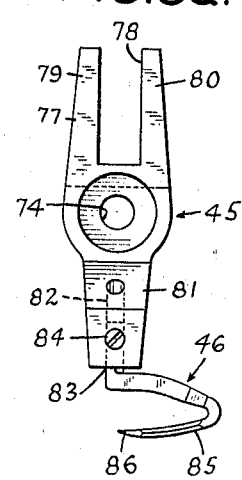
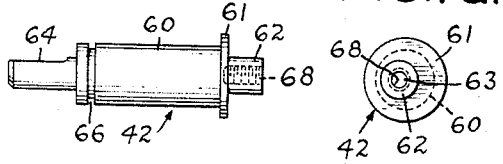
FIG.7.   FIG.7a.

Oct. 17, 1967 G. C. ROTH 3,347,190
LOOPER MECHANISM FOR BLIND STITCH SEWING MACHINES
Filed April 5, 1966 6 Sheets-Sheet 3

Oct. 17, 1967  G. C. ROTH  3,347,190
LOOPER MECHANISM FOR BLIND STITCH SEWING MACHINES
Filed April 5, 1966  6 Sheets-Sheet 4

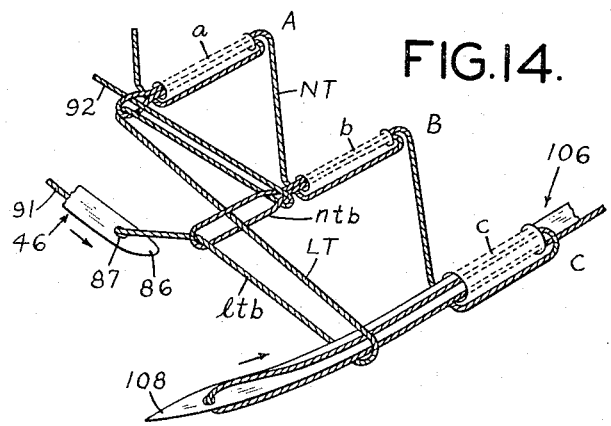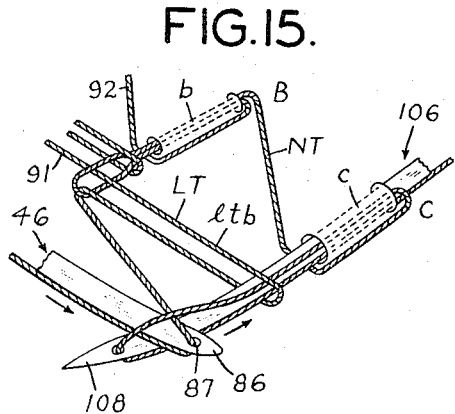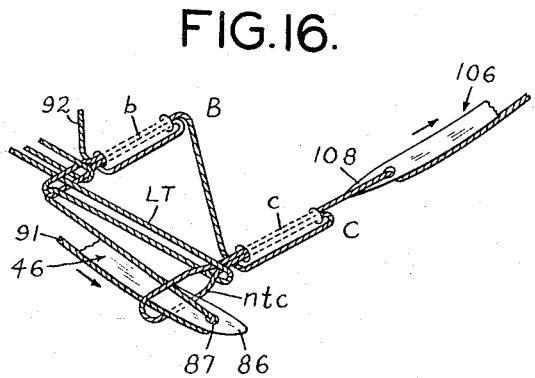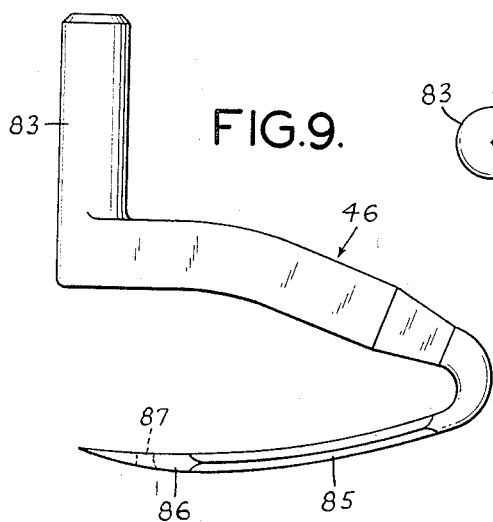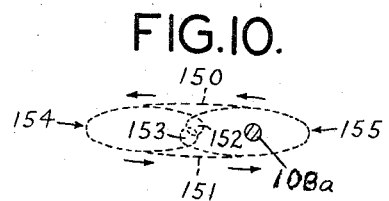

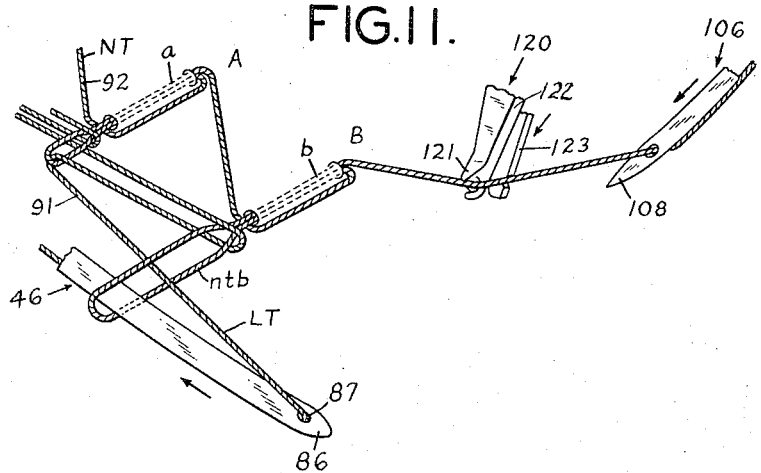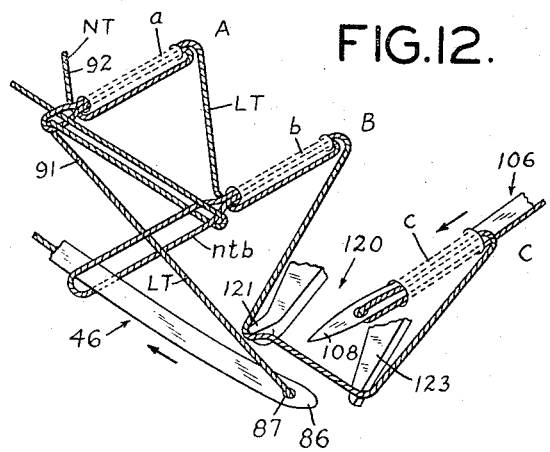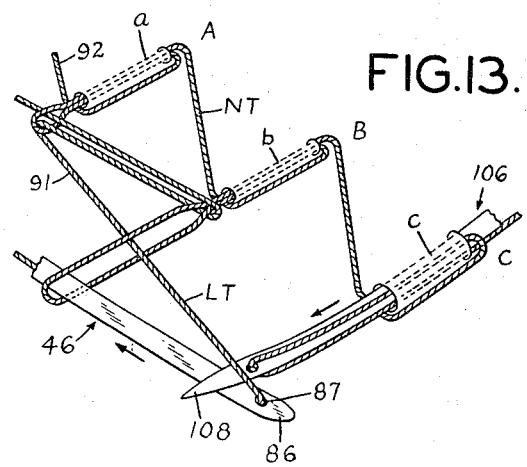

| United States Patent Office | 3,347,190
Patented Oct. 17, 1967 |
|---|---|

3,347,190
LOOPER MECHANISM FOR BLIND STITCH SEWING MACHINES
Gerald C. Roth, Bethpage, N.Y., assignor to Union Special Machine Company, Chicago, Ill., a corporation of Illinois
Filed Apr. 5, 1966, Ser. No. 540,354
12 Claims. (Cl. 112—176)

This invention relates to blind stitch sewing machines, and more particularly to machines having mechanism for producing two thread chainstitch blind stitch seams.

More particularly the invention relates to looper actuating mechanisms for producing two thread chainstitch blind stitch seams, the looper mechanism being such that it may be constructed in the form of an adapter which may be used on existing blind stitch sewing machines, or the looper mechanism may be constructed as an integral part of a new two thread chainstitch blind stitch sewing machine.

The primary objects of the invention are: to provide an improved looper mechanism for blind stitch sewing machines, which may be synchronized with the needle mechanism to cooperate therewith in any desired ratio; to provide a looper mechanism for blind stitch sewing machines wherein the looper element is operated in a substantially vertical plane that extends perpendicular to the vertical plane of the sewing needle movement; to provide a looper mechanism wherein the looper element cooperates with the sewing needle in concatenating the looper thread and needle thread after the fashion of the well known two thread chainstitch; to provide a looper mechanism adapted for infinite adjustment, so as to insure that it can be timed in such manner as to cooperate most advantageously with the needle mechanism, regardless of the extent of the stroke of the needle; to provide a looper mechanism for blind stitch sewing machines wherein the looper element motion in relation to the sewing needle is such that it passes over the needle, and below the needle once during every cycle of its oscillation. Other objects will become apparent from the description which follows.

According to the invention a blind stitch sewing machine, having a frame, a main drive shaft and a stitching head driven by said main shaft and mechanism oscillating the needle in a path of travel across the material to be sewn, may be provided with a looper mechanism which includes a looper lever carrying a looper element, the looper lever being pivotally fulcrumed intermediate its ends on an orbiting pivot and being oscillated back and forth about its pivoted fulcrum while said orbiting pivot is moving in its orbital path and the lever pivot may, if desired, be caused to revolve in its orbit more than one time for each cycle of oscillation of the looper lever, this arrangement providing an almost infinite variation of adjustment as to stroke and timing so that the lever mechanism is applicable to a wider variation of blind stitch sewing machines than prior art looper mechanisms.

Although the novel features which are believed to be characteristic of the invention are pointed out in the annexed claims, the invention itself, as to the above mentioned and other objects appearing hereinafter, and as to its advantages and the manner in which it may be carried out, may be better understood from the following more detailed description taken in connection with the accompanying drawings, forming a part hereof, in which:

FIG. 2 is an end view of the sewing machine stitching head partly in section and with certain parts broken away showing the manner of driving the looper mechanism;

FIG. 4 is a front view of the sewing machine head partly broken away and showing parts of mechanism shown in FIG. 1;

FIG. 5 is a view of the oscillating lever for driving the needle thread spreading mechanism, this view being taken on line 5—5 of FIG. 4;

FIGS. 6 and 6a are side and end views, respectively, of the shaft for oscillating the looper lever;

FIGS. 7 and 7a are side and end views, respectively, showing the shaft on which the looper lever is pivotally fulcrumed;

FIGS. 8 and 8a are side and front views, respectively, of the looper lever which carries the looper element;

FIGS. 9 and 9a are, respectively, a view in elevation and a top plan view to larger scale of the looper element;

FIG. 10 is a diagrammatic view to illustrate the path of travel of the looper element point; and FIGS. 11 to 16, inclusive, are diagrammatic views to illustrate progressive steps in the formation of the stitches made by the machine illustrated in the other views.

Figure 1:
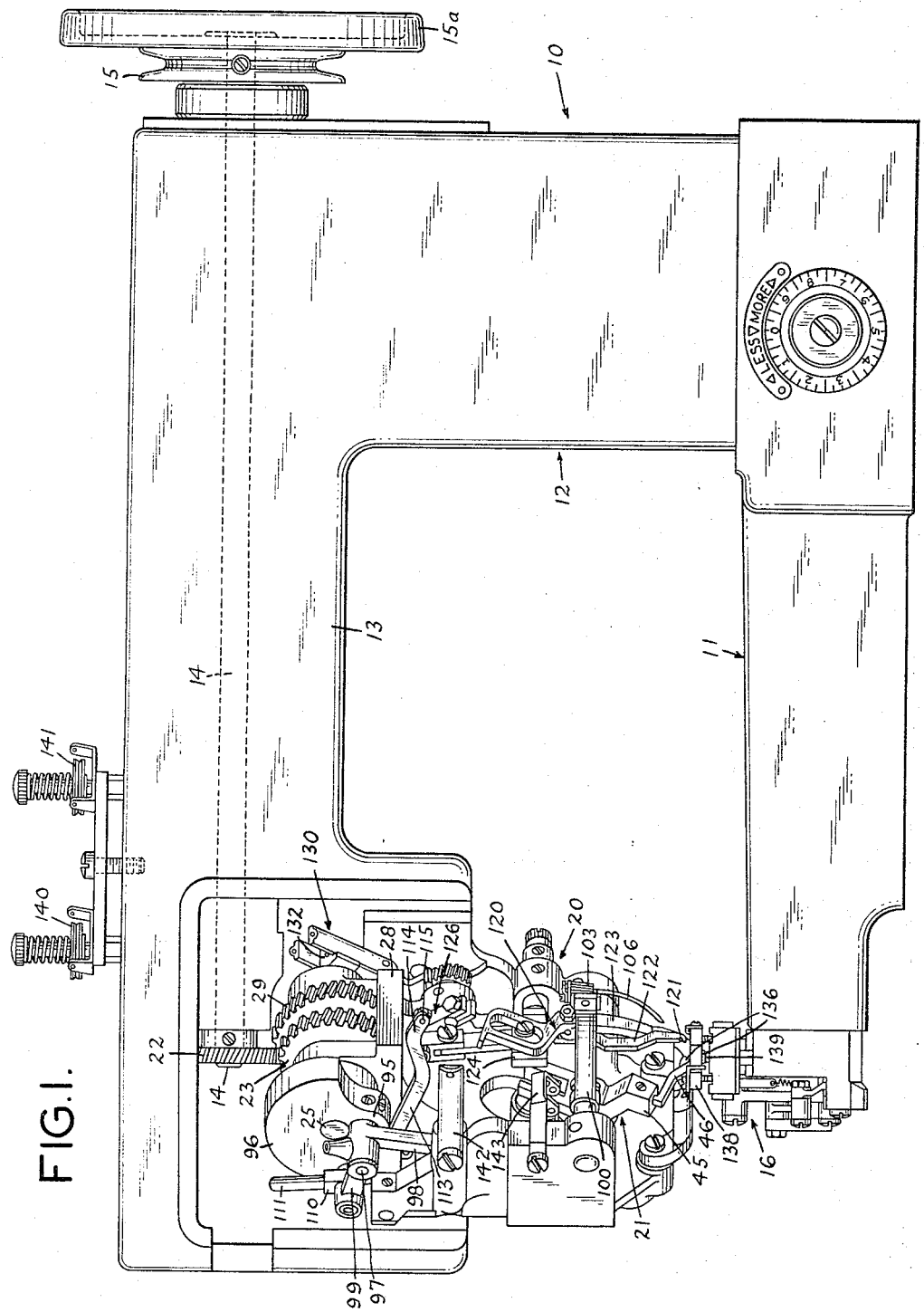
FIG. 1 is a front view of a blind stitch sewing machine equipped with the improved looper mechanism.

Referring now to the drawings in which like reference characters indicate similar parts throughout the several views, 10 indicates generally the sewing machine on which the stitchforming mechanism is mounted. Generally speaking, the frame and shafts, gears and other main driving parts of the sewing machine may be of the type disclosed in U.S. patents, Lewis—No. 1,172,812, Feb. 22, 1916, and Whitelaw—No. 1,176,415, Mar. 21, 1916. As shown, the frame comprises a hollow base 11; an upstanding hollow post 12, and a horizontally disposed hollow arm 13. The main drive shaft 14 of the machine is suitably and rotatably mounted in the hollow arm 13 and driven by a drive pulley 15; there being suitable driving cams and shafts in the hollow post 12 operated by the main drive shaft 14 for driving the various shafts extending through the hollow base 11 for operating the work handling mechanisms 16, all as well known in the art. The stitching head, designated generally by reference character 20, is mounted on the frame casting, as will be described in further detail hereinafter. The looper mechanism, designated generally by reference character 21, constitutes a part of the stitching head.

Figure 3:
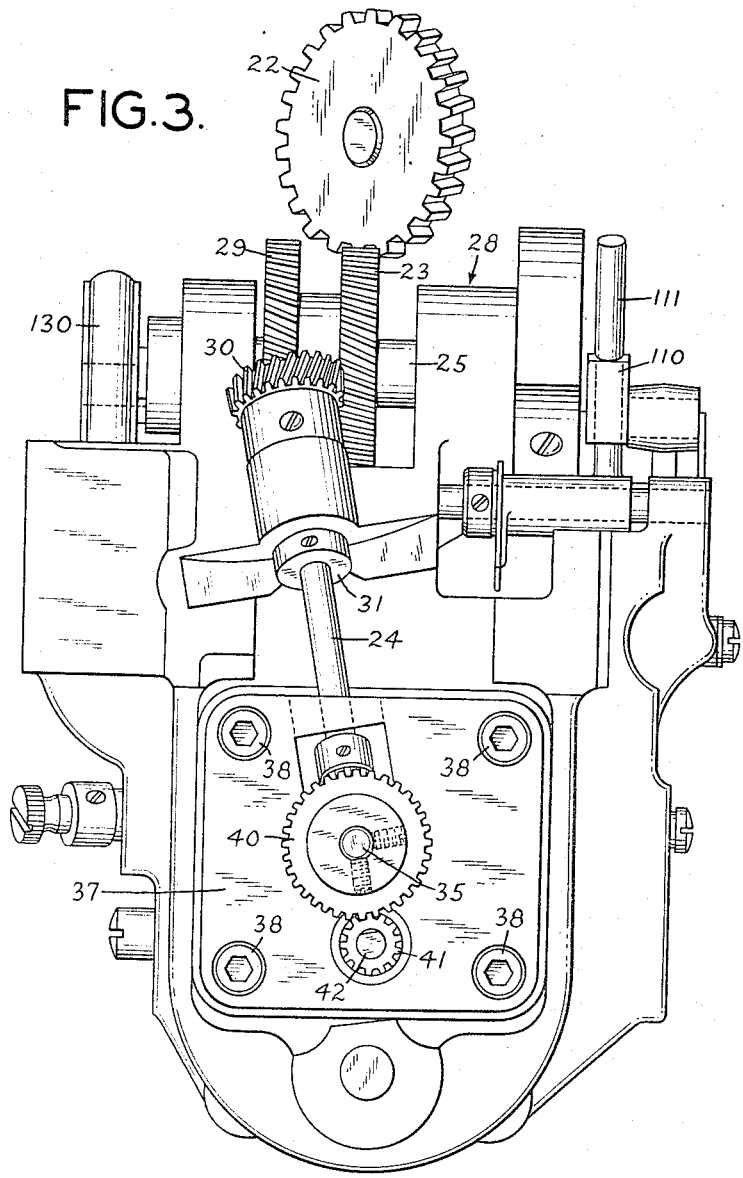
FIG. 3 is a view at right angle to FIG. 2, showing certain driving parts and the manner of securing the adaptor plate to the machine casting.

The stitch forming elements, constituting the sewing or stitching head 20, are mounted in a manner to be driven by the sewing machine main shaft 14 through the medium of a one to one (1:1) spiral gear coupling 22, 23. Spiral gear 22 is secured to and driven by the machine main shaft 14 and rotates spiral gear 23, which in turn rotates jack shaft 25, which is the main drive shaft of the stitching head. In the construction, as shown, the driving connection between the looper mechanism and shaft 14 is formed by an inclined looper drive shaft 24. Spiral gear 23 is secured to transverse jack shaft 25 which is mounted for rotation in suitable bearings 26, 27 in the casting 28 constituting a part of the frame. Mounted on and secured to the same main shaft 25 of the stitching head is a spiral gear 29 which meshes with a spiral gear 30 (see FIGS. 2 and 3) secured to the upper end of inclined shaft 24. This shaft is mounted for rotation in bearings 32 and 34a in the casting 28. A ring 31 secured to the shaft provides means for preventing unwanted axial movement of the shaft 24. Secured to the lower end of inclined shaft 24 is a bevel gear 33 below bearing 34a. Bevel gear 33 meshes with a bevel gear 34 mounted on and secured to a transverse jack shaft 35 rotatably mounted in a bearing bushing 36, press fitted or otherwise secured to a mounting plate 37. The mounting plate is adapted to be removably secured to the casting 28 of the frame by means of stud screws 38; or other suitable securing means may be used.

Mounted on the protruding end portion of rotatable jack shaft 35 is a gear 40 which meshes with a smaller pinion gear 41 secured to the protruding end of another shaft 42 mounted for rotation in a bearing bushing 43 press fitted or otherwise suitably secured to the mounting plate 37. The axes of rotation of said shafts 35 and 42 are parallel and lie in the same plane but this plane is not vertical, but is somewhat inclined, the angle of inclination is adjusted with reference to the needle stroke and is an important factor for locating the stitchforming zone along the looper element path. The particular angle of inclination of the plane through the axes of shafts 35 and 42 with reference to the plane of the needle path is a matter for adjustment dependent on the particular machine to which the looper mechanism is applied. As shown, the angle $y$ between the plane through the axes of rotation of shafts 35 and 42, and the plane in which the sewing machine needle oscillates, is about six degrees (6°).

The driving ratio of gear coupling 29, 30, as shown, is two to one (2:1), whereas the driving ratio of gear coupling 33, 34 is one to two (1:2), which results in an over-all ratio of one to one (1:1). That is, the jack shaft 25 rotates at the same angular velocity as the shaft 35. As shown, the gear ratio of gear 40 to gear 41 is three to one (3:1).

The shafts 35 and 42 are so contrived that, upon rotation, they drive the looper actuating lever 45 which carries a looper element 46, as described in further detail hereinafter. The upper shaft 35 (see FIGS. 2, 6, 6a) has a journal portion 50 having an annular disk flange 51 from which outwardly extends a stud pin 52 which is mounted eccentrically of the axis 53 of rotation of shaft 35; the disk and stud 52 forming in effect a crank. This shaft 35 is herein for convenience of description sometimes referred to as the looper-lever-drive shaft. The opposite end of the shaft 35 has a flat portion 54 upon which is mounted bevel gear 34 which has a threaded screw 55 in its hub portion for clamping the bevel gear on the shaft. Driving gear 40 is also mounted on the flat end portion 54 of the shaft and clamped by means of a threaded set screw 56 extending through a threaded bore in its hub portion. The bearing bushing 36 has an annular shoulder 57 which abuts the mounting plate 37. The smaller diameter portion 58 of the bearing bushing extends through an aperture in the plate and is press fitted therein. The inner annular surface of the flange 51 abuts the outside annular surface of the annular shoulder 57 of the bushing and prevents movement of the shaft 35 in an axial direction toward gear 34 and the inner annular surface of this gear engages the end of the bushing and prevents inward movement of the shaft in the opposite axial direction. However, the journal portion of the shaft 35 is rotatable in the bearing bushing 36.

The lower shaft 42 (see FIGS. 2, 7, 7a) has a journal portion 60 having an annular flange 61 from which outwardly extends a stud pin 62 which is mounted eccentrically of the axis 63 of rotation of shaft 42; the disk flange 61 and stud 62 forming, in effect, a crank. This shaft 42 is herein for convenience of description sometimes referred to as the looper-lever-fulcrum shaft. The opposite end of the shaft 42 has a flat, reduced diameter, portion 64 upon which is mounted pinion gear 41 which has a threaded set screw 65 in its hub portion for clamping this portion on shaft 42. This shaft also has an annular groove 66 to accommodate a retaining ring 67. The outwardly extending, eccentrically positioned stud pin 62 has an axial, threaded bore 68 to accommodate a threaded stud screw 76 for retaining a bearing washer 75. The bearing bushing 43 has an annular shoulder 71 which abuts the mounting plate 37; the smaller diameter portion 72 of the bearing bushing extending through and press fitted in an aperture in the mounting plate. The inner annular surface of the flange 61 abuts the outside annular surface of the annular shoulder 71 of the bushing and prevents axial movement of the shaft 42 in a direction toward the mounting plate and the inner annular surface of the retainer ring 67 in groove 66 abuts the end of the bushing 72 and prevents axial movement of the shaft 42 in the opposite direction. However, the journal part of shaft 42 is rotatable in the bearing bushing 43.

The looper lever 45 (see FIGS. 2, 8, 8a) is pivotally fulcrumed at a median point intermediate its ends, on the stud pin 62, which, as mentioned, is fixed to flange 61 eccentrically of the axis of rotation 63 of the shaft 42; the bore 74 in the lever 45 providing a bearing for the stud pin 62. Thus the lever 45 is free to rotate on pin 62 so that it may rock back and forth around the axis of eccentric pivot pin 62; it being understood that upon rotation of shaft 35, the pivot pin travels in a circular orbit around the axis of rotation 63 of shaft 42. The looper lever is retained on the pivot pin 62 by means of a retaining washer 75 held in place by a stud screw 76 threaded into the bore 68 of the pin 62.

The upper arm 77 of the looper lever 45 is bifurcated, or forked, to provide a guide slot 78 between the tines 79, 80 of the upper arm. The lower arm 81 of the looper lever, which is offset from the upper arm as shown in FIG. 8, is provided with a socket 82 to receive the butt end or shank portion 83 of the looper element 46; the looper element being adjustably clamped into the socket 82 by a set screw 84. The looper element, which for convenience of description may be referred to as a looper finger, is shaped, as shown in FIGS. 9 and 9a, and comprises the shank butt portion 83, curved blade portion 85, and a point portion 86 provided with an eye 87 through which the looper thread (LT) 92 passes. It will be observed that the angled shank, blade and pointed portion of the looper element lie in the same plane (see FIG. 9a).

A slide block 89 (see FIG. 2) having parallel guide flanges 90 along its sides is rotatably mounted on stud pin 52 which, as mentioned, is fixed to flange 51 and positioned eccentrically of axis of rotation 53 of shaft 35. The slide block 89 is mounted to slide in the slot 78 of the upper arm of the looper lever, the tines 79 and 80 of the upper lever arm 77 serving as guideways on each side of the block. The block 89 is prevented from moving outwardly in axial direction off of the pin 52 by the flanges 90 which may engage the inner surfaces of the tines 79, 80 of the upper arm of the looper lever. Now it will be seen that the lever 45 is caused to rock back and forth angularly about the stud pin 62 as a fulcrum point. This is brought about by rotation of the shaft 35 causing the stud pin 52 to move in its circular orbit around the axis of rotation 53 of the shaft, this in turn causing the slide block to slide up and down in slot 78 of the looper lever to cause the lever to oscillate about its pivoted fulcrum. The extent of angular movement of the lever, oscillating back and forth about its pivot pin 62, depends on the radius of the orbit of pin 52. At the same time, the pivot pin 62 is travelling in an orbit around the axis of rotation 63 of shaft 42, these two shafts being rotated by gear coupling 40, 41 which, as shown, is in a ratio of three to one (3:1). That is, the first shaft 42 rotates about its axis of rotation three times to one revolution of the second shaft 35 about its axis of rotation. Thus it will be seen that the pivoted fulcrum is travelling in a circular orbit as the lever is oscillating back and forth about the pivoted fulcrum. This compound movement of the looper lever and its attached looper element is described in further detail later on.

The mechanism for operating the sewing needle and its related connecting parts and the work handling mechanism for advancing the work through the stitch forming head in proper position for the stitch forming operation may be of a kind known in the art. For example, these mechanisms may be of the type disclosed in said United States Patents No. 1,712,812 and No. 1,176,415. In those patents the looper thread is carried by a looper thread bobbin, and rotary hook arrangement. It will now be seen that in the machine embodying this invention, the looper mechanism is based on an entirely different concept from that employed in those patents.

The mechanism, as shown, for operating the sewing needle and its related operating parts is driven from the shaft 25, which is the main shaft of the stitching head. It is driven by gear coupling 22, 23. The shaft 25 is mounted for rotation in suitable left and right bearings 26, 27 of the head and from it are driven all of the timed parts of the stitch forming mechanism, comprising primarily, in the machine shown, the looper mechanism, and the sewing needle mechanism.

Shaft 25 at its left end has a crank arm 95 counterbalanced as at 96 for balance of the moving parts, the wrist pin 97 of said crank carrying a bell crank lever having a long vertical arm 98 and a short horizontal arm 99. The long arm 98 of the bell crank lever constitutes a link connection, pivotally attached at its lower end to a lever forming an integral extension from one extremity of the needle bar 100 of arcuate or yoke shape, pivoted in suitable bearings 101, 102 on opposite sides of the head frame 28 to oscillate on an axis substantially parallel with the head main shaft 25.

Centrally of its span the needle bar 100 is provided with a clamp head 103 equipped with a needle clamp 104 and thread guide and tensioner 105, this clamp receiving the butt of the sewing needle 106 which is of suitable curvature; the curved needle having an eye 107 in its leading pointed end portion 108.

In general, the needle bar mechanism is arranged in such manner that with each rotation of the head shaft 25, the needle 106 is oscillated back and forth through approximately a quadrant of a circle, while the looper element is oscillating in one cycle.

The take-up for the needle thread is driven from head shaft 25 through movements of the short bell crank arm 99, referred to above. This arm has pivoted to its outer end a slide block 110 engaging a cylindrical arm 111 projecting from rocking sleeve 112 which carries the take-up arm 113. The sleeve is mounted for oscillation on a short shaft mounted in the head casting. This arrangement, which is known in the art, being such that the take-up arm 113 projects forwardly and its forward or eye end 114, having an eye 115, operates vertically in timed relation with the other working elements of the stitch forming mechanism. The downward movement of the take-up 113 is relatively slow compared to its upward movement with practical dwells occurring at both ends of the excursion of the take-up.

The stitching head, as shown, is equipped with a needle thread looper and spreader device (designated generally by reference character 120) of a type known in the art, such device being used when it is desired to produce a two thread chain stitch blind stitch seam with an overcast thread. For example, a looper-spreader device as disclosed in said Whitelaw U.S. Patent No. 1,176,415 may be employed. However, in certain circumstances it may or may not be used. Whether or not it is employed may be left to the user of the machine. As shown, the main looper point 121 (see FIGS. 1 and 4) carried by or constituting part of looper bar 122 and an auxiliary or spreader member 123 cooperating with the point 121 in the presentation of the overcast bight of the sewing needle thread in proper relation to the needle path; all in timed relation with the other moving parts of the machine, as known in the art. The main looper bar 122 is mounted in slideblock 124 which is carried by a shaft 125 pivotally mounted in a suitable bearing in the frame. The looper bar 122 constitutes a lever of the first class, slidable relative to its fulcrum, its upper end having connection with mechanism 126 comprising suitable bell crank and levers connected to rotatable shaft 125. This shaft is suitably rocked by means of a pinion 127 thereon, meshing with a gear segment 128, on a pivoted lever 130, oscillating about a shaft 129 mounted on the frame. The gear segment lever 130 (see FIG. 5) has a bifurcated arm providing a slot 131 in which a block 132 slides up and down. The block is pivotally mounted on eccentrically positioned stud 133 carried on a disk 134 which is carried upon rotatable main shaft 25 of the sewing head. As pointed out in further detail in said Patent No. 1,176,415, the differential speed movement of the looper point and spreader is such that the looper structure makes its forward excursions rapidly, dwells in loop presenting position appropriately for cooperation with the needle, and then makes its return to loop engaging position in slower time.

The work handling mechanism (designated generally by reference character 16), as shown (see FIG. 1), is of a kind known in the art. For example, it may be one as disclosed in said Patent No. 1,176,415 and is contrived to advance the material to be stitched in increments through the stitching head in timed relation with the other operating parts of the machine. As shown, the frame has at its bottom a presser foot 135 (see FIG. 4) provided with an aperture 136 through which the goods to be blind stitched may be presented from below by the work handling mechanism, so that said work may be acted upon by the needle, which reciprocates above the presser foot, across the work opening.

The needle 106, of course, enters and emerges on the same side of the work. The work handling mechanism, such as may be employed adequately to present the work to the action of the needle, per se, forms no part of the present invention, but fragmentary parts of such mechanism are illustrated at 16, representing a feed member 138 working across the bed of the machine to feed goods away from the operator and 139 representing a node former contrived and operative to work up and down in the presser foot opening to present a node of goods to the needle, all as known in the art.

In the machine above described, special tension means have been installed comprising a pair of the customary tension disks 140 and 141 and two eyelets 142 and 143 for the looper thread 91 (designated herein as LT). It will be understood that the sewing needle thread 92 (designated herein as NT) is passed through the various eyelets and tensioners, thence through the eye 107 of the sewing needle 106 and the looper thread 91 is passed through the tensioners 143 and through the eye 87 in the point portion 86 of the looper element 46, as will be understood by those skilled in the art.

Referring again more particularly to the looper mechanism for the looper thread, it will be observed that the point 86 of the looper element 46 is arranged for horizontal oscillation in a plane 147 (see FIG. 2) and for cooperation with the needle 106 oscillating in a plane 145 (see FIG. 4) which is perpendicular to the plane 147.

The looper motion produced by the looper mechanism is a compound motion. It comprises an angular movement of the actuating level 45 about the stud 62 as its fulcrum, causing the above mentioned oscillation of the looper element 46, and a vertical movement of said lever 45, thus causing the looper element lift or avoid motion. The horizontal oscillation is brought about by the rotation of shaft 35, more specifically by the orbiting eccentric stud 52 cooperating with the sliding block 89 moving up and down in the slot 78 of the forked end of the lever 45. This drive arrangement and the motion is a variable speed movement or differential speed movement causing the looper element to oscillate at diminishing and increasing rates of speed at certain increments in its path of oscillation. The looper lift or avoid motion is caused by eccentric stud 62 which, being the fulcrum of lever 45, is orbited about the axis of rotation of shaft 42. By means of this driving combination, the motion of the looper element 46 can be varied extensively. The motion depends, first, on the ratio at which both shafts, 35 and 42, are rotated in relation to each other and, second, on the relative position both studs, 52 and 62, are placed in with relation to each other. Due to the orbiting fulcrum stud 62, the looper motion will always appear slightly unorthodox, i.e., the horizontal oscillation will be interrupted as many times as both eccentric studs 52, 62 assume a common center line with shafts 35 and 42; that is, when the axes of studs 52, 62 and shafts 35, 42 all lie in the same plane. The number of times this will happen during one cycle, i.e. both ways of the looper motion, depends on the ratio at which shafts 35 and 42 are rotated in relation to each other, whereas the timing, i.e. when it will happen, depends on the adjustment of the eccentrics, 52, 62, in relation to each other. It should be noted that the motion of the looper element 46 may easily be changed by changing gear coupling 40, 41 to a different ratio. The adjustment of eccentrics 52, 62 in relation to each other may be accomplished by loosening the mounting screw 65 for pinion 41 anl disengaging the latter from gear 40 and then rotating shaft 43 until eccentric 62 is in the desired position with respect to eccentric 52 and then replacing, meshing and clamping the pinion on its shaft in adjusted position. The above adjustments are of utmost importance for appropriately timing the movement of the looper element with the movement of the sewing needle. A further adjustment for accurately timing the looper motion with respect to the needle motion may be made anywhere along the gear train connecting the looper mechanism with the needle drive. In the arrangement, as shown in the accompanying drawings, this latter adjustment may be accomplished by disengaging the gears of couplings 29, 30 or 33, 34 and slightly rotating the actuating looper lever 45, and/or the machines hand wheel 15a until the desired adjustment is achieved and then reengaging the gears and securing them in the newly adjusted position.

It will be seen from the foregoing that the looper mechanism permits an almost infinite variety of adjustments; this being of significant advantage because it greatly extends the range of application of the invention with blind stitch sewing machines.

In the machine illustrated, the adjustment of the looper motion is based, for proper cooperation with the needle motion, on a three to one (3:1) ratio between gears 40 and 41 causing shaft 42 to rotate on its axis three times to each rotation of shaft 35 on its axis. With this ratio, the path of the looper element point 86 resembles a pair of small loops between a pair of substantially horizontal ellipses as illustrated in diagrammatic fashion in FIG. 10. The path comprises, in effect, a generally flat top arc 150 and bottom arc 151 of similar shape, the top arc being interrupted by one of two small loops 152, and the bottom arc being interrupted by the other of said two small loops 153. In this arrangement, the eccentrics 52, 62 assume a common center line with the shafts 35, 43 twice during one cycle, which accounts for the two interruptions per oscillation. Said eccentrics are so adjusted in relation to each other that said small circular motions or loops 152, 153 are produced medianly of each of said arcs 150, 151 (timing). Thus the entire looper motion appears to be composed of two evenly sized flat ellipses 154, 155 which slightly overlap each other, and two small disposed loops 152, 153, one depending from said top arc 150 and the other rising from said bottom arc 151. The direction of movement of the looper point 86 is indicated by the arrows in FIG. 10 and the path of movement of the needle point 108 is indicated at 108a; the path of travel of the needle being in a plane at right angle to the plane of oscillation of the looper element. The earlier mentioned angle of inclination of the plane 146 through the axes of rotation of shafts 35, 42 from the plane 145 of the path of the oscillating needle 46 is approximately 6° in the machine, as illustrated in FIG. 4. Consequently, the path of the looper motion has been placed slightly to the left so that the path of the needle penetrates the right hand ellipse 155 at a median point thereof, as illustrated diagrammatically in FIG. 10. Thus the looper element 86 will alternately pass over and below the needle 106 in each cycle for producing the desired concatenation of the looper and needle threads.

As has been indicated in the foregoing, a blind stitch sewing machine embodying the invention is advantageously suited to producing a two-thread blind stitch seam concatenated after the fashion of the well known double-thread chain stitch, an example of such seam being disclosed in Lewis U.S. Patent No. 1,155,360, issued Oct. 5, 1915. See particularly FIG. 5 of that patent which shows a seam employing two threads concatenated in a similar manner as a seam stitched by the chain stitch blind stitch machine shown and described herein.

Progressive steps of stitching operation performed by the machine described herein are illustrated diagrammatically in FIGS. 11 to 16. In said figures, the needle thread 92 is indicated by reference character NT; the looper thread 91 by LT; the places of penetration of the needle 106 through the cloth in forming the stitches A, B, C, being indicated by a, b, c; and the arrows indicating direction of travel. FIG. 11 illustrates the relative positions of the needle 106 and looper element 46 at the beginning of the forward stroke of the needle toward the place it will penetrate the cloth to form stitch C; stitch A having been almost completed and stitch B having been partially completed. The spreader 120 is about to spread a bight of the needle thread and the looper element has begun its rearward stroke; the loop $ntb$ surrounding the looper element. In FIG. 12, the spreader 120 has spread a bight of needle thread and the needle on its forward stroke has penetrated the cloth at c; the looper element proceeding on its rearward stroke. In FIG. 13 the needle in its forward stroke is crossing over the looper element and the looper element is continuing on its rearward stroke; the needle passing over the needle thread bight. FIG. 14 shows the looper element, after it has completed its rearward stroke and is beginning its forward stroke and the needle has begun its rearward stroke; stitch A having been completed; the looper thread loop $ltb$ extending through needle thread loop $ntb$ and around the needle. In FIG. 15 the looper element continuing on its forward stroke is passing over the needle which is progressing on its rearward stroke. FIG. 16 shows the needle retracted from the cloth and continuing on its rearward stroke and the looper continuing on its forward stroke. At the end of the rearward stroke of the needle, it begins its forward stroke and the cycle is repeated to produce a two-thread chain stitch, blind stitch seam with an overcast thread.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a blind stitch sewing machine having a frame, a main drive shaft and a stitching head driven by said main shaft including a mechanism oscillating the needle in a path of travel across the material to be stitched, said path of travel of the needle lying in a substantially vertical plane, the combination of an oscillating looper lever carrying a looper element and having a fulcrum intermediate its ends, a first shaft mounted for rotation, a first pivot means eccentrically connected to said first shaft to travel in an orbital path and on which said lever is mounted for oscillation about its fulcrum and about said first pivot means, a second shaft mounted for rotation, a second pivot means eccentrically connected to said second shaft to travel in an orbital path, lever operating means engaging said second pivot means and said lever causing said lever to oscillate about said fulcrum during movement of said first and second pivot means in their orbital paths of travel, said lever mounted to oscillate said looper element back and forth in a path of travel lying in a plane substantially perpendicular to the plane of the path of travel of said needle, and gear means connected with said shafts for rotating them simultaneously about their axes of rotation.

2. In a blind stitch sewing machine as set forth in claim 1, said first pivot means eccentrically connected to said first shaft comprising a stud pin mounted on a stud holding member at the end portion of said first shaft and extending in an axial direction so that it travels in a circular orbital path about the axis of rotation of said first shaft, and said second pivot means comprising a stud pin mounted on a stud holding member at the end portion of said second shaft and extending in an axial direction so that it travels in a circular orbital path about the axis of rotation of said second shaft, and said lever operating means engaging said second pivot means and said lever comprising a slide block member slidable on said lever and pivotally mounted on said stud pin on said second shaft.

3. In a blind stitch sewing machine as set forth in claim 2, said first and second shafts being mounted with their axes of rotation parallel with each other and said axes lying in the same plane.

4. In a blind stitch sewing machine as set forth in claim 3, said first and second shafts being mounted so that the plane through their axes of rotation lies at an angle to the substantially vertical plane through the path of travel of the needle.

5. In a blind stitch sewing machine as set forth in claim 4, the angle between said inclined plane through the axes of rotation of said shafts and the plane of the needle path being approximately 6°.

6. In a blind stitch sewing machine as set forth in claim 3, in which said stitching head includes a main shaft driven by said sewing machine main drive shaft and said means connected with said first and second shafts for rotating them on their axes of rotation comprise a looper drive shaft connected by gear coupling to said head main shaft and by gear coupling to said second shaft and gear coupling comprising a drive gear mounted on said second shaft meshing with a driven gear mounted on said first shaft.

7. In a blind stitch sewing machine as set forth in claim 6, the gear ratio of said gear couplings being selected so that said first shaft rotates at a greater angular velocity than said second shaft.

8. In a blind stitch sewing machine as set forth in claim 7, the gear ratio of the gear coupling connecting said first and second shafts is three to one and the angle between the plane through the axes of rotation of said first and second shafts and the substantially vertical plane through the needle path is approximately 6°.

9. In a blind stitch sewing machine as set forth in claim 8, the second shaft of the looper mechanism being geared to rotate one revolution to each cycle of oscillation of the needle.

10. In a blind stitch sewing machine according to claim 1 the stitching head includes looper and spreader means for thread threaded in the needle so that the sewing machine is capable of producing a chain stitch blind stitch seam with an overcast thread.

11. A looper mechanism in the form of an adapter for installation on a blind stitch sewing machine having a frame, an oscillating sewing needle whose path of oscillation lies in a substantially vertical plane and having looper driving means, which looper mechanism comprises an adapter plate for securing said mechanism to said frame, a first member providing a bearing secured to said plate and a second member providing a bearing secured to said plate with the central axes of said bearings parallel to each other, a first shaft mounted for rotation in said first bearing, a first shoulder member on said first shaft, a first pivot stud on said first shoulder member extending axially and mounted eccentrically of the axis of rotation of said first shaft, a second shaft mounted for rotation in said second bearing, a second shoulder member on said second shaft, a second pivot stud on said second shoulder member extending axially and mounted eccentrically of the axis of rotation of said second shaft, gear means connecting said first and second shafts rotating said first and second shafts simultaneously, a looper lever having an upper arm and a lower arm, said lower arm carrying a looper element, said looper lever being pivotally fulcrumed between said arms on said first pivot stud, a slide block pivoted on said second pivot stud and slidable on said upper arm for oscillating said lever on its fulcrum about the axis of said first pivot stud, means for securing said plate to said frame, and means for operatively connecting one of said first and second shafts to the sewing machine looper driving means.

12. A looper mechanism as set forth in claim 11, in which the axes of rotation of said first and second shafts lie in the same plane and said first and second shafts are geared to rotate the first shaft at an angular velocity three times greater than the angular velocity of the second shaft.

References Cited

UNITED STATES PATENTS

| | | | |
|---|---|---|---|
| 1,155,360 | 10/1915 | Lewis | 112—178 X |
| 1,172,812 | 2/1916 | Lewis | 112—177 |
| 1,176,415 | 3/1916 | Whitelaw | 112—177 |
| 1,347,313 | 7/1920 | Whitelaw et al. | 112—177 |
| 1,989,919 | 2/1935 | Everitt | 112—199 X |
| 2,074,793 | 3/1937 | Mann | 112—176 |
| 2,113,107 | 4/1938 | Bowman | 112—178 |

FOREIGN PATENTS 346,045 12/1921 Germany.

JORDAN FRANKLIN, *Primary Examiner.*

H. ROSS, *Assistant Examiner.*